April 28, 1964  C. J. PRANGE  3,130,432
SEWER ROD FEED REEL WITH YIELDABLE MOUTH CLOSURE MEANS
Filed Feb. 4, 1963
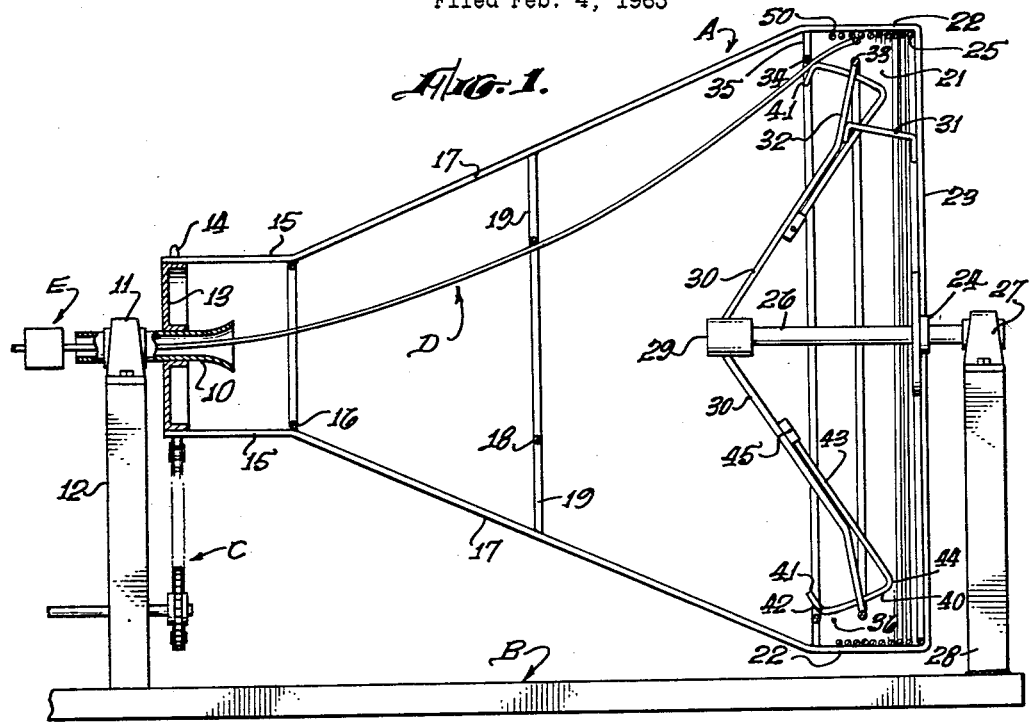
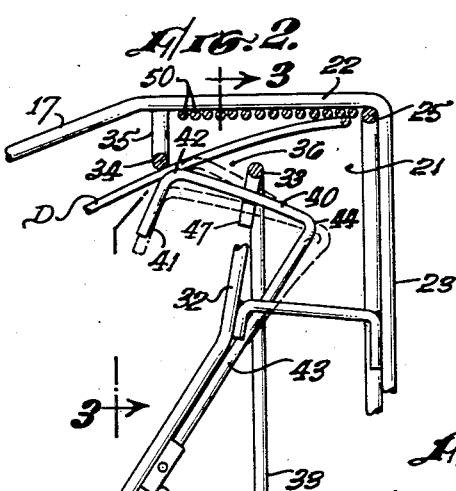
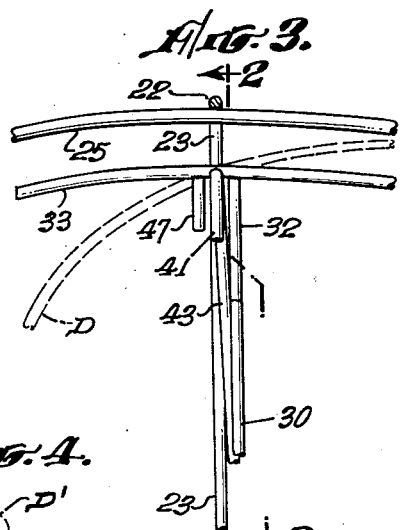
CHARLES J. PRANGE,
INVENTOR.
BY Lynn H. Latta
ATTORNEY.

United States Patent Office 3,130,432
Patented Apr. 28, 1964

3,130,432
SEWER ROD FEED REEL WITH YIELDABLE
MOUTH CLOSURE MEANS
Charles J. Prange, Lima, Ohio, assignor to Flexible
Sewertool Corporation, Lima, Ohio, a corporation
of Ohio
Filed Feb. 4, 1963, Ser. No. 256,036
15 Claims. (Cl. 15—104.3)

This invention relates to reeling and feeding mechanism for a sewer tool drive rod and has as its general object to provide an improved rod feed reel of the conical cage type wherein the drive rod is dispensed and retracted through a nozzle in the small end of the reel and is stored in an annular storage chamber in the peripheral area of the large end of the reel. In such a reel, there is necessarily a continuous annular mouth providing communication between the storage chamber and the adjacent area within the reel, through which the drive rod may be drawn from the storage chamber or fed into the storage chamber, as occasion may require. During such feeding movements, the point of passage of the rod through the annular mouth will continuously precess around the circumference of the mouth while the length of rod extending between the mouth and the nozzle at the forward end of the reel will describe a generally conical path of revolution about the reel axis. The principal object of the present invention is to provide retainer means obstructing the storage chamber mouth in a manner to normally retain the reeled coils of rod within the storage chamber, yet yieldable to permit passage of the rod through the mouth both in the discharge and the return movements of the rod as it is projected or retracted by the apparatus in a sewer cleaning operation.

More specifically, the invention provides a plurality of yieldable retainer fingers bridging across the storage chamber mouth at circumferentially spaced points so as to normally close the mouth at those points, said fingers being successively yieldable in one direction in response to pressure from the drive rod in its precessional projecting movement, and yieldable in the opposite direction in response to pressure of the drive rod in its precessional return movement.

A further object is to provide a reel in which the drive rod will be coiled against the peripheral portion of the storage chamber rather than against the radially inner portion thereof.

Other objects and advantages will become apparent in the ensuing specification and appended drawing in which:

FIG. 1 is an axial sectional view through a rod feed reel embodying my invention;

FIG. 2 is a fragmentary detail sectional view on a larger scale, showing a retainer finger in its normal position and its positions deflected to respective sides of the normal position, the parts being seen as indicated by line 2—2 of FIG. 3;

FIG. 3 is a transverse sectional view, looking rearwardly at one of the retainer fingers, as indicated by line 3—3 of FIG. 2; and FIG. 4 is a detail of a portion of FIG. 2, on a larger scale.

Description

Referring now to the drawings in detail, I have shown therein, as an example of one form in which the invention may be embodied, a feed reel A mounted upon a frame B for rotation on a horizontal axis when driven by a reel drive C, and housing a sewer tool drive rod D which may be subjected to longitudinal feeding movements in both projecting and retracting directions by a known feed unit indicated schematically at E.

Reel A comprises a generally conical cage having a small end provided with a tubular guide throat 10 through which the drive rod D is fed as it is projected out of the reel or retracted into the reel. Throat 10 may also function as a trunnion, mounted in a suitable bearing 11 on a standard 12 forming part of frame B. Mounted upon the throat 10 is a hub or spider 13 having a rim provided with sprocket teeth 14 to receive the drive from drive mechanism C. To the rim of spider 13 are secured the forward ends of a series of circumferentially spaced cage bars 15 which are also secured to a spacer ring 16. Rearwardly from the spacer ring 16, the bars 15 diverge in conical array, at 17. A guide ring 18 is disposed in the intermediate area of the cage, coaxial with the reel axis and mounted to the flaring cage bars 17 by a series of radial spokes 19 which may be welded to the bars 17 and to the ring 18.

At the rear end of the cage, a storage chamber 21 is defined peripherally by rear end portions 22 of the cage bars, parallel to the reel axis and formed as bent continuations of the diverging bars 17. The bar portions 22 are connected by integral right angle bends to a corresponding series of radial spokes 23, the inner ends of which are secured to an axle hub 24. A spacer ring 25 is secured in the internal corners of the bends between rod portions 22 and spokes 23. Hub 24 is mounted on an axle 26 which in turn is mounted in bearing 27 on a pillar 28 forming part of frame B. Axle 26 extends a substantial distance into the reel cage and carries another hub 29 at its forward end. A plurality of bracing spokes 30 are secured at their inner ends to the hub and radiate therefrom in conical array, rearwardly toward the spacer ring 25. A circumferential array of corresponding bridge bars 31 connect the outer ends of bracing spokes 30 to respective rear end spokes 23, the ends of the bridge bars 31 being welded or otherwise suitably secured to the spokes 30 and 23. Bridge bars 31 define the inward annular bottom member of the storage chamber 21.

The forward side of storage chamber 21 is defined partially by a series of bars 32 extending in a generally radial direction outwardly from bridge bars 31 and secured to a retainer ring 33 which is spaced inwardly from the peripheral bars 22 of the storage chamber. A second guide ring 34 is spaced axially forwardly of ring 33 and is mounted on a series of short radial bars 35 secured to the bends between bar sections 17 and 22. Bars 35 define a portion of the forward side of chamber 21. Between the rings 33 and 34 (FIG. 2) there is defined an annular mouth 36 through which the drive rod D passes.

The internal structure of the reel cage, including guide rings 34 and 18, defines a generally conical space for the feeding movements of drive rod D between the reel chamber 21 at its larger end and the guide throat 10 at its smaller end.

It will be understood that the rings 16, 18, 25, 33 and 34 are circular, and that the path of precessing movement of drive rod D at the point where it passes through mouth 36 is a circular path.

Mouth 36 is normally closed by a circumferential array of retainer fingers 40 each having a guard tip 41 joined to its forward end by a bend 42 and each having a flexible staff 43 joined to its rear end by a bend 44. Each staff 43 lays alongside a respective brace spoke 30 and has its inner end anchored thereto by a mounting sleeve 45. Each finger 40 extends forwardly from the outer end of the respective staff 43, having considerable clearance inwardly of ring 33 and normally having its forward end, as defined by bend 42, disposed closely adjacent (or in contact with) the forward guide ring 34. The guard tip 41 extends inwardly from bend 42 in an approximately radial direction. The finger 40, its tip 41 and its staff 43 are formed of a single length of spring rod, suitably bent to provide the configuration shown, which is approximately comparable to the numeral 7.

The finger 40 is confined between a respective reel bar 32 on one side and a guide finger 47 on its other side (FIG. 3). Each guide finger 47 has its outer end secured, as by welding, to the retainer ring 33, and extends radially inwardly approximately parallel to an adjacent spoke portion 32.

*Operation*

In the operation of the reel feed apparatus of the invention, reel A will be rotated by power from a suitable source, transmitted through drive C to sprocket 14. The rotation of the reel transmits rotation to the drive rod D for rotating a suitable sewer cleaning tool at its forward end.

As required, drive rod D is projected forwardly into a sewer or withdrawn therefrom by operation of the feed unit E. Its portion not in use is stored in the chamber 21 in circular coils 50 which are coiled against the inner sides of the peripheral bars 22 of the chamber 21. The stretch of rod extending forwardly from the reel chamber 21 to the nozzle 10 follows a path of cork-screw spiral form, spiralling inwardly and forwardly through the mouth 36, with sliding bearing engagement against the inner side of the forward guide ring 34. As this spiralling portion of the drive rod precesses circumferentially in the mouth 36, it will successively come into engagement with the bends 42 of retainer fingers 40. Where the drive rod is being projected from the reel, it will engage the bends 42 from the rear and with inwardly and forwardly directed pressure as indicated at D' in FIG. 4. In exerting the inward pressure, the rod D will be backed up by the guide ring 34 against which it is sliding, and it will thereby be guided into the crevice between the bend 42 and the guide ring 34. In response to the inward pressure, the finger 40 will flex inwardly to the inwardly deflected position shown in broken lines in FIG. 2, widening the crevice between ring 34 and bend 42 into a gap through which the guide rod will pass. This will happen successively at each retainer finger 40 as the guide rod precesses around the reel in being uncoiled from the storage chamber 21. In shifting forwardly and inwardly, finger 40 will flex with reference to its staff 43, largely at bend 44.

When the drive rod is being retracted into the storage chamber 21, the spiralling portion passing through the mouth 36 will engage the tip 41 of the retainer finger and will be guided thereby into engagement with the forward side of bend 42 in the forward crevice between the bend and guide ring 34, and will exert rearward pressure against bend 42 approximately as indicated at D'' in FIG. 4. Again, the drive rod will be wedged against the ring 34 and in response to the rearward pressure, finger 40 will shift rearwardly so as to widen the crevice into a gap between bend 42 and ring 34, through which the drive rod may enter the storage chamber 21. In shifting rearwardly, finger 40 will cause its staff 43 to flex rearwardly approximately as indicated in dotted lines in FIG. 2.

The finger tips 41 tend to direct the returning drive rod outwardly for coiling against the peripheral portion 50 of the cage structure within the storage chamber.

I claim:

1. Sewer rod reel-feed mechanism comprising: a reel cage having means defining therewithin a generally conical space for feeding of a sewer tool drive rod between the large and small ends of said space; means supporting said reel cage for rotation about a major axis extending between and coaxial with said ends; said reel cage having at said small end a tubular guide throat coaxial with said major axis and having, adjacent said large end, means defining an annular peripheral storage chamber having an annular mouth on its side facing toward said guide throat, said means including a ring defining one side of said mouth; and a yieldable retainer finger normally traversing said mouth to normally retain the coils of said rod within said chamber; said finger being yieldable in opposite directions in response to pressure of said rod when being fed toward said throat through said mouth and when being retracted, respectively, to open a gap between said ring and finger, through which a respective coil of said rod may be projected from or retracted into said chamber.

2. Sewer rod reel-feed mechanism comprising: a reel cage defining in its interior a generally conical rod-feeding space having relatively large and small ends, said cage being rotatable about a major axis extending between said ends and having a guide throat at said small end; means adjacent said large end defining an annular peripheral storage chamber having an annular mouth on its side facing toward said guide throat, said means including a ring defining one side of said mouth; and a plurality of yieldable retainer fingers normally traversing said mouth at circumferentially spaced points to normally retain the coils of said rod within said chamber, said fingers being yieldable in opposite directions in response to pressure of said rod when being fed toward said throat through said mouth and when being retracted, respectively, to open a gap between said ring and a respective finger, through which a respective coil of said rod may be projected from or retracted into said chamber.

3. Sewer rod reel-feed mechanism comprising: a reel cage of generally conical form having a major axis about which it is rotatable and having at its smaller end a guide throat through which the rod can be projected from or retracted into the cage; spaced annular members within the larger end of said cage cooperating with the peripheral and end portions of said cage at said larger end to define an annular rod-storage chamber within which a succession of coils of said rod may be coiled against said peripheral cage portion, said annular members defining between them an annular mouth through which a spiral portion of said rod may pass while precessing circumferentially of the cage in the uncoiling and projection, or the retraction and coiling of successive coils between said chamber and throat; and a plurality of yielding retainer fingers carried by said larger end of the cage and traversing said mouth to normally retain said coils within said chamber, each finger having a free end portion disposed adjacent one of said annular members and yieldable in opposite directions in response to pressure of said spiral portion when being fed toward said throat through said mouth and when being retracted, respectively, to open a gap between a respective finger and the adjacent annular member, through which a respective coil of said rod may be projected from or retracted into said chamber.

4. Reel-feed mechanism as defined in claim 3, including, within said reel, a guide ring concentric with said axis and disposed intermediate said throat and storage chamber, for guiding said spiral rod portion between said mouth and throat, in a configuration in which said spiral portion is bowed inwardly toward said axis.

5. Sewer rod reel-feed mechanism comprising: a reel cage of generally conical form rotatable on the axis of generation of said form while feeding a sewer tool guide rod therein between the larger and smaller ends thereof, said cage having at its smaller end a guide throat through which said rod can be projected from, or retracted into the cage; a pair of axially-spaced rings mounted within said cage in radially-inwardly spaced relation to a peripheral portion of said cage at its larger end; means cooperating with said rings and said peripheral portion to define within said cage an annular rod-storage chamber within which successive coils of said rod may be coiled against the inner side of said peripheral portion; said rings defining between them an annular mouth through which a spiral portion of said rod may extend between said throat and a connected coil within said chamber while precessing around said mouth in the uncoiling and projection, or the retraction and coiling, of successive coils of said rod; a plurality of circumferentially-spaced retainer fingers traversing said mouth in a generally axial direction and each having a free end projecting generally toward said smaller end and disposed closely adjacent the ring nearest said smaller end, and corresponding staffs of resilient rod material, each having an outer end integrally joined to the other end of a respective retainer finger and an inner end secured to said cage, said staffs being adapted to flex so as to provide for yielding of the respective finger in opposite directions in response to pressure of said spiral portion when being fed toward said nozzle through said mouth and when being retracted, respectively, to open a gap between said nearest ring and said respective finger, through which a respective coil of said rod may be projected from or retracted into said chamber.

6. Reel-feed mechanism as defined in claim 5, including an axle on which said larger end of the cage is mounted for rotation, and a plurality of spokes, radiating from the end of said axle nearest said smaller end, outwardly and toward said larger end in conical array, said staffs being disposed alongside respective spokes and having their inner ends anchored thereto.

7. Sewer rod reel-feed apparatus comprising: a generally conical reel cage having a small forward end and a large rear end and rotatable about its cone axis, said cage embodying a conical array of lateral rods, a circumferential array of peripheral rod elements projecting rearwardly from said lateral rods substantially parallel to said axis and collectively defining the periphery of said large end; a forward end member to which the forward ends of said lateral rods are secured; a rod-guide throat in the center of said forward end member, through which the sewer rod may be projected and retracted; rear end means secured to and supporting the rear ends of said peripheral rod elements; an axle on which said rear end means is mounted; bearings supporting said forward end member and said axle respectively for rotation of said cage on said cone axis; a pair of rings, coaxial with said cone axis; a series of spokes secured to the forward end of said axle, radiating therefrom and secured to and supporting one of said rings in a position spaced forwardly and inwardly from said rear end means and from said peripheral rod elements respectively; means mounting the other ring to said peripheral rod elements in spaced relation to said one ring so as to define an annular mouth that is open throughout a full circumference; means bridging between said radiating spokes and said rear end means, spaced radially inwardly from said peripheral rod elements and cooperating therewith and with said rear end means to define an annular storage chamber communicating through said mouth with the intermediate area within said cage, said chamber functioning to store the coils of a sewer tool drive rod coiled against said peripheral rod elements, with a portion of said rod, continued from one of said coils, extending through said mouth, traversing said intermediate area with a contour spiralling around said cone axis, passing through said throat, and precessing circumferentially in opposite directions around said cone axis in a generally conical path during respective projective and retractive feeding movements; and a plurality of latches each comprising a flexible staff secured to a respective spoke and extending alongside said spoke toward said storage chamber, and a finger projecting across said mouth from the outer end of the staff and normally assisting in retaining said coils in said chamber, said finger being yieldable in opposite directions in response to pressure of said drive rod at the point of passage through said mouth where said finger makes contact with said spiralling portion in the course of said precessing movement, so as to momentarily open the mouth at the point of contact, to effect passage of successive portions of the drive rod through said mouth.

8. Apparatus as defined in claim 7, wherein said rings are disposed in axially spaced planes and wherein said finger extends forwardly past the inner side of the rearward mouth ring to a point adjacent the forward mouth ring.

9. Apparatus as defined in claim 7, wherein said rear end means comprises a series of spokes disposed generally in a radial plane, and a hub on said shaft, said rear end spokes being secured to and radiating from said hub and their outer ends being joined by integral bends to the respective peripheral rod elements.

10. Sewer rod reel-feed mechanism comprising: a reel cage of generally conical form rotatable on its cone axis, said cage having a small forward end and a larger rear end and having at said forward end a guide throat through which a sewer tool drive rod can be projected from or retracted into the cage; forward and rear axially spaced rings mounted within said cage in radially-inwardly spaced relation to a peripheral portion of said cage at its larger end; means cooperating with said rings and said peripheral portion to define within said cage an annular rod-storage chamber within which successive coils of said rod may be coiled against the inner side of said peripheral portion; said rings defining between them an annular mouth through which a spiral portion of said rod may extend between said throat and a connected coil within said chamber while precessing around said mouth in the uncoiling and projection, or the retraction and coiling, of successive coils of said rod; a plurality of circumferentially-spaced retainer fingers traversing said mouth and each having a free end disposed closely adjacent said forward ring, said fingers having respective staff members secured to said cage, said staff members being flexible to provide for yielding of the respective fingers in opposite directions in response to pressure of said spiral portion when being fed toward said throat through said mouth and when being retracted, respectively, to open a gap between said forward ring and a respective finger, through which a respective coil of said rod may be projected from or retracted into said chamber, each finger having a free end portion including a bend normally disposed closely adjacent said forward ring at a rearwardly and inwardly disposed point on the cross-sectional circumference thereof, and a tip projecting inwardly from said bend toward said cone axis.

11. Apparatus as defined in claim 10, including a guide finger secured to and projecting inwardly from said rearward ring and spaced circumferentially from a respective spoke by a space slightly wider than the thickness of a respective retainer finger, and wherein said respective retainer finger is embraced and retained between said guide finger and said respective spoke.

12. Apparatus as defined in claim 11, wherein said finger tip diverges inwardly and forwardly with respect to said drive rod at the time of contact of the drive rod against the finger.

13. Apparatus as defined in claim 12, wherein said one ring is positioned to provide for sliding bearing contact of the precessing portion of the drive rod thereagainst and will guide said drive rod into wedging engagement between said finger tip and said one ring, such as to effect spreading action of the finger with reference to said one mouth ring.

14. Sewer rod reel-feed apparatus comprising: a generally conical reel cage having a small forward end and a large rear end and rotatable about its cone axis, said cage embodying a conical array of lateral rods, a circumferential array of peripheral rod elements projecting rearwardly from said lateral rods substantially parallel to said axis and collectively defining the periphery of said large end; a forward end member to which the forward ends of said lateral rods are secured; a drive-receiving sprocket carried by said forward end member; a rod guide throat projecting through and secured to the center of said forward end member, through which a sewer tool drive rod may be projected and retracted; rear end means secured to and supporting the rear ends of said peripheral rod elements; an axle on which said rear end means is mounted, said axle having a forward end projecting into the reel from said rear end means; bearings in which said guide throat and said axle are respectively journalled for rotation of said cage on said cone axis; a pair of rings, coaxial with said cone axis; a series of spokes secured to the forward end of said axle radiating therefrom and secured to and supporting one of said rings in a position spaced forwardly and inwardly from said rear end means and from said peripheral rod elements respectively; means mounting the other ring to said peripheral rod elements in spaced relation to said one ring so as to define an annular mouth that is open throughout a full circumference; means bridging between said radiating spokes and said rear end means, spaced radially inwardly from said peripheral rod elements and cooperating therewith and with said rear end means to define an annular storage chamber communicating through said mouth with the intermediate area within said cage, said chamber functioning to store the coils of said drive rod coiled against said peripheral rod elements, with a portion of said drive rod, continued from one of said coils, extending through said mouth, traversing said intermediate area with a contour spiralling around said cone axis, passing through said throat, and precessing circumferentially in opposite directions around said cone axis in a generally conical path during respective projective and retractive feeding movements; and a plurality of latches, each comprising a flexible staff secured to a respective spoke and extending alongside said spoke toward said storage chamber, and a finger projecting across said mouth from the outer end of the staff and normally assisting in retaining said coils in said chamber, said finger being yieldable in opposite directions in response to pressure of said rod at the point of passage through said mouth where said finger makes contact with said spiralling portion in the course of said precessing movement, so as to momentarily open the mouth at the point of contact, to effect passage of successive portions of the drive rod through said mouth.

15. Apparatus as defined in claim 10, including, within said cage, a guide ring concentric with said axis, and a plurality of connecting bars secured to and extending inwardly from respective lateral rods of said cage, secured to said guide ring supporting the same in a position, spaced radially inwardly from said lateral rods, and disposed intermediate said throat and said storage chamber, for guiding said spiral rod portion between said mouth and throat, in a configuration in which said spiral portion is bowed inwardly toward said axis.

References Cited in the file of this patent
UNITED STATES PATENTS

| | | |
|---|---|---|
| 2,167,087 | Quick | July 25, 1939 |
| 2,167,268 | Sanger | July 25, 1939 |
| 3,071,794 | Prange | Jan. 8, 1963 |